United States Patent
Grühbaum et al.

(10) Patent No.: US 6,938,459 B2
(45) Date of Patent: Sep. 6, 2005

(54) METHOD FOR DETECTING MOISTURE LEVEL IN APPARATUS FOR TREATING AND PREPARING FOOD AND RELATED FOOD TREATMENT AND PREPARATION APPARATUS

(75) Inventors: Klaus Grühbaum, Landsberied (DE); Johannes Hillmann, Neu-Ulm (DE)

(73) Assignee: eloma GmbH Grosskuchentechnik, Maisach (DE)

( * ) Notice: Subject to any disclaimer, the term of this patent is extended or adjusted under 35 U.S.C. 154(b) by 0 days.

(21) Appl. No.: 10/375,410

(22) Filed: Feb. 27, 2003

(65) Prior Publication Data
US 2003/0167823 A1 Sep. 11, 2003

(30) Foreign Application Priority Data
Mar. 7, 2002 (EP) .................................. 02005109

(51) Int. Cl.⁷ .............................................. G01N 29/02
(52) U.S. Cl. .................... 73/24.04; 73/23.01; 73/24.04; 73/29.01; 73/861.01; 73/31.01
(58) Field of Search ............................ 73/24.04, 23.2, 73/29.01, 861.01, 31.01

(56) References Cited

U.S. PATENT DOCUMENTS 6,662,628 B2 * 12/2003 Horvath et al. ............ 73/29.01

FOREIGN PATENT DOCUMENTS

| DE | 2 259 459 | 6/1974 | |
|---|---|---|---|
| DE | 42 06 845 C2 | 10/1997 | |
| WO | WO 01/53797 AL | 7/2001 | |
| WO | WO 200153797 A1 * | 7/2001 | ............. A23L/1/01 |

* cited by examiner

Primary Examiner—Hezron Williams
Assistant Examiner—André K. Jackson
(74) Attorney, Agent, or Firm—Jansson, Shupe, Munger & Antaramian, Ltd.

(57) ABSTRACT

The present invention refers to a method of detecting the moisture in an apparatus for treating and preparing food, as well as to a method of treating and preparing food. In the method according to the invention, the current temperature values and speed values of the asynchronous motor driving a gas supply and circulation mechanism are compared to at least one characteristic line which is stored in a computer, and the current moisture in the gas mixture is determined from the deviation $\Delta N$ of the measured speed from the speed of the stored characteristic line. The present invention also comprises an apparatus for treating and preparing food that, in particular, serves to carry out the method of determining the moisture in a gas mixture.

23 Claims, 4 Drawing Sheets

METHOD FOR DETECTING MOISTURE LEVEL IN APPARATUS FOR TREATING AND PREPARING FOOD AND RELATED FOOD TREATMENT AND PREPARATION APPARATUS

FIELD OF THE INVENTION

The present invention refers to a method for detecting the moisture in an apparatus for treating and preparing food and to an apparatus for treating and preparing food.

BACKGROUND OF THE INVENTION

There has been a demand for some time for a modern apparatus used to treat and prepare food that can adapt its treatment and preparation methods as much as possible to the food, i.e. that can control the cooking chamber climate as much as possible. Increased moisture in the gas mixture in the cooking chamber is necessary for different treatment and preparation steps or processes, such as "steaming". While detecting the temperature in the cooking chamber is relatively simple and reliable, the detection of the moisture in the gas mixture in the cooking chamber can be quite difficult.

Complex moisture sensors have previously been proposed, such as the one disclosed in GB 2 207 514 A. Moisture sensors of this kind are not very reliable, their structure is expensive, and they are seriously subject to contamination.

Turning away from the direct moisture measurement, the indirect moisture detection approach was established among the experts, wherein different methods of detection were suggested.

An indirect method of detecting the moisture is known from DE 42 06 845 C2, in which a pressure difference in a flow within the gas mixture is built up by a rotor. This pressure difference is measured and the density of the gas mixture is derived therefrom. The density is used for determining the portion that is water vapor.

The disadvantage of this method is, however, the very low pressure difference of 1 to 2 mbar that results. Consequently, on the one hand, expensive measuring means for determining the small pressure difference are required and, on the other hand, the smallest fluctuations can lead to a result that is not decisive.

The method according to DE 100 02 309 C1 goes in a different direction Here the difference between the rotational speed generated when driving the gas conveyance and circulation means as compared to the synchronous speed of the asynchronous motor, i.e. the slip, is used as a measure of the portion of the gas component sought by taking predetermined pressure and temperature values of the gas mixture into consideration.

Here again, since pressure-dependent values are important, reliable pressure detection remains necessary. Moreover, even though the slip results from the difference between the specific standard speed of the asynchronous motor and the actual speed, other influences on the actual speed, such as the properties of the voltage supply, the degree of wear to the components of the motor as well as of the entire apparatus, etc, are left out of consideration. This affects the preciseness of detection on the one hand, and, on the other hand, requires a very high expenditure on technical apparatus.

SUMMARY OF THE INVENTION

It is the object of the present invention to provide a method for detecting the moisture in an apparatus for treating and preparing food, where the moisture in the gas mixture within the apparatus can be determined in a simple manner and without any pressure detection.

It is also an object of the invention to provide for a corresponding apparatus that treats and prepares food.

According to the method of the present invention, the current measured values of temperature and speed are compared with at least one characteristic line, which is stored in a computer. The current moisture in the gas mixture is determined from the deviation $\Delta N$ between the measured speed and the speed corresponding to the stored characteristic line.

The characteristic line is generated under defined conditions of the apparatus. As a result, because the conditions present when generating the characteristic line are known, the current moisture in the gas mixture can be determined quite precisely from the difference between the current speed of the asynchronous motor with a corresponding known comparative value.

One defined condition that is highly preferred is for that of a dry gas mixture, a mixture where practically no moisture exists. This characteristic line is then a kind of base characteristic line since, when referring its values with those where there is a more moist gas mixture in the cooking chamber, a lower speed of the asynchronous motor is not achieved. When the moisture rises, the speed of the asynchronous motor increases.

Having the characteristic line generated under defined conditions of the apparatus leads to certain special advantages. One such advantage is that generation of the characteristic line takes into consideration how the speed of the asynchronous motor is influenced by the apparatus itself and its components. In particular, such influences include the direction of rotation of the gas supply and circulation means, usually a radial fan, and the size of the cooking chamber. The impact upon the speed of the motor due to variations arising during manufacture of the apparatus, which are unavoidable, are also eliminated, since, according to the method of the invention, a specific characteristic line is generated for each apparatus.

In one preferred embodiment of this invention, generation of the characteristic line is achieved by the computer of the apparatus storing the speeds of the motor that are detected over a range of temperatures beginning with the apparatus being cold at room temperature (approx. 20° C.) up to its maximum possible process temperature.

In a further advantageous manner, calibration of the apparatus is carried out at the location where the method is being implemented by generating the characteristic line at that location. As a result, pressure differences between the location of manufacture and the location of use of the apparatus can automatically be eliminated.

Moreover, an additional benefit is that a new or re-calibration can be carried out repeatedly during the run time or life of the apparatus. The ability to run a new calibration of the apparatus at any time during the life of the apparatus means that the changes caused by aging of the apparatus, e.g. wear of the asynchronous motor, soiling of the seals, etc., can be taken into consideration.

In an especially preferred embodiment, the moisture detected in accordance with this invention is used as a control variable in the operation of a moisture controller to regulate the moisture content of the gas mixture and thereby the room climate in an apparatus for treating and preparing food. This results in a moisture control for the gas mixture in the apparatus that works in an extremely simple manner and much more efficiently as compared to the prior art.

The subject matter of the present invention is also directed to an apparatus for treating and preparing food. The apparatus includes a cooking chamber in which a gas mixture is located, a gas supply and circulation mechanism which serves to circulate the gas mixture within the cooking chamber, to introduce gases into the cooking chamber, and to discharge gases from the cooking chamber, an asynchronous motor which drives the gas supply and circulation mechanism, a speedometer for measuring the speed of the asynchronous motor, a temperature sensor for measuring the temperature in the cooking chamber, and a computer and control unit which receives and processes the values measured. According to the present invention, the computer unit compares the measured values of the temperature and the speed with a stored characteristic line and determines or calculates the current moisture in the gas mixture.

In a most preferred embodiment of this invention, an efficient moisture control is achieved. The apparatus is provided with a controllable device for supplying moisture and a controllable device for discharging moisture. Depending upon the result of a comparison of the detected moisture with a moisture target value for the current treatment and/or preparation step, either the moisture supply device is activated in the event the moisture is too low or the moisture discharge device is activated when the moisture is too high. Neither of these devices becomes active when the desired moisture (target value) corresponds to the measured moisture (actual value).

Further details, features and advantages of the present invention can be derived from the following description with reference to the drawings.

DETAILED DESCRIPTION OF PREFERRED EMBODIMENTS

Figure 1:
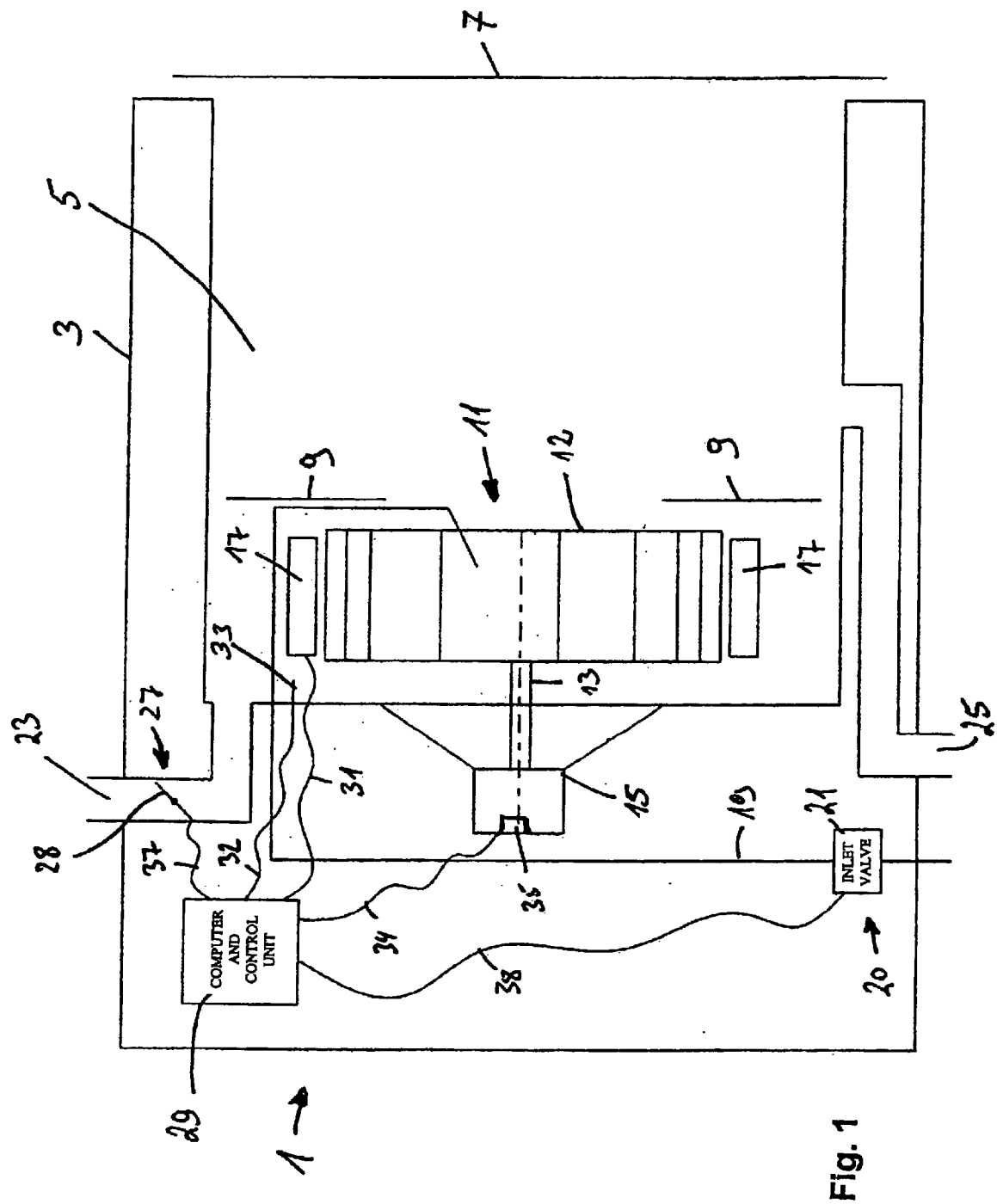
FIG. 1 shows a schematic structural view from the side of an apparatus according to the invention for treating and preparing food in a first embodiment.

FIG. 1 is a first embodiment of the apparatus for treating and preparing food according to the invention. The apparatus 1 according to the invention comprises a housing 3 in whose front portion a cooking chamber 5 is formed which serves to accommodate food to be treated and/or prepared. The cooking chamber 5 is closed on the side from which it is filled by an apparatus door 7 and is accessible via this door.

A spoiler 9 is formed on the side of the cooking chamber opposite from the apparatus door 7, said spoiler serving to generate an appropriate flow pattern of the gas mixture (e.g. hot air or vapor) in the cooking chamber 5.

A gas supply and circulation mechanism 11 is positioned behind the spoiler 9 in a convention manner, said gas supply and circulation mechanism being in the form of a radial ventilation fan 12 according to the embodiment of FIG. 1. The radial ventilation fan 12 is seated on a shaft 13, which is the drive shaft of an asynchronous motor 15.

In order to heat up the cooking chamber atmosphere, a heating means 17 is provided around the gas supply and circulation mechanism 11, said heating means being shown schematically only. According to the embodiment of FIG. 1, this heating means may consist of a plurality of heating pipes (not shown) extending, essentially parallel, around the ventilation fan.

In order to introduce additional moisture into the cooking chamber, a water supply device 19 is provided that includes a controllable inlet valve 21. The water supply device 19 opens adjacent to the front vertical section of the radial ventilation fan 12 assigned to the cooking chamber 5 and directed towards the central portion of said radial ventilation fan.

Furthermore, the apparatus according to the invention includes an air inlet channel 23 and a discharge or outlet channel 25. The air inlet channel 23 includes a controllable moisture discharge device 27 for discharging moisture from the cooking chamber. According to the embodiment of FIG. 1, the moisture discharge device 27 is in the form of a controllable flap 28. The controllable inlet valve 21 serves vice versa as a controllable moisture supply device 20 for supplying moisture into the cooking chamber.

In the rear portion of the device 1 according to the invention, a computer and control unit 29 is provided. This unit communicates via a first line 31 with the heating means 17.

The computer and control unit 29 further communicates via a second line 32 with a temperature sensor 33, which detects the temperature of the gas mixture circulated by the radial ventilation fan 12 within the cooking chamber 5.

Furthermore, the computer and control unit 29 is connected to a speedometer 35 of the asynchronous motor 15 via a third line 34. In this embodiment, the unit 29 is able to detect the speed of the asynchronous motor 15 and the temperature of the gas mixture existing within the cooking chamber 5.

Figure 2:
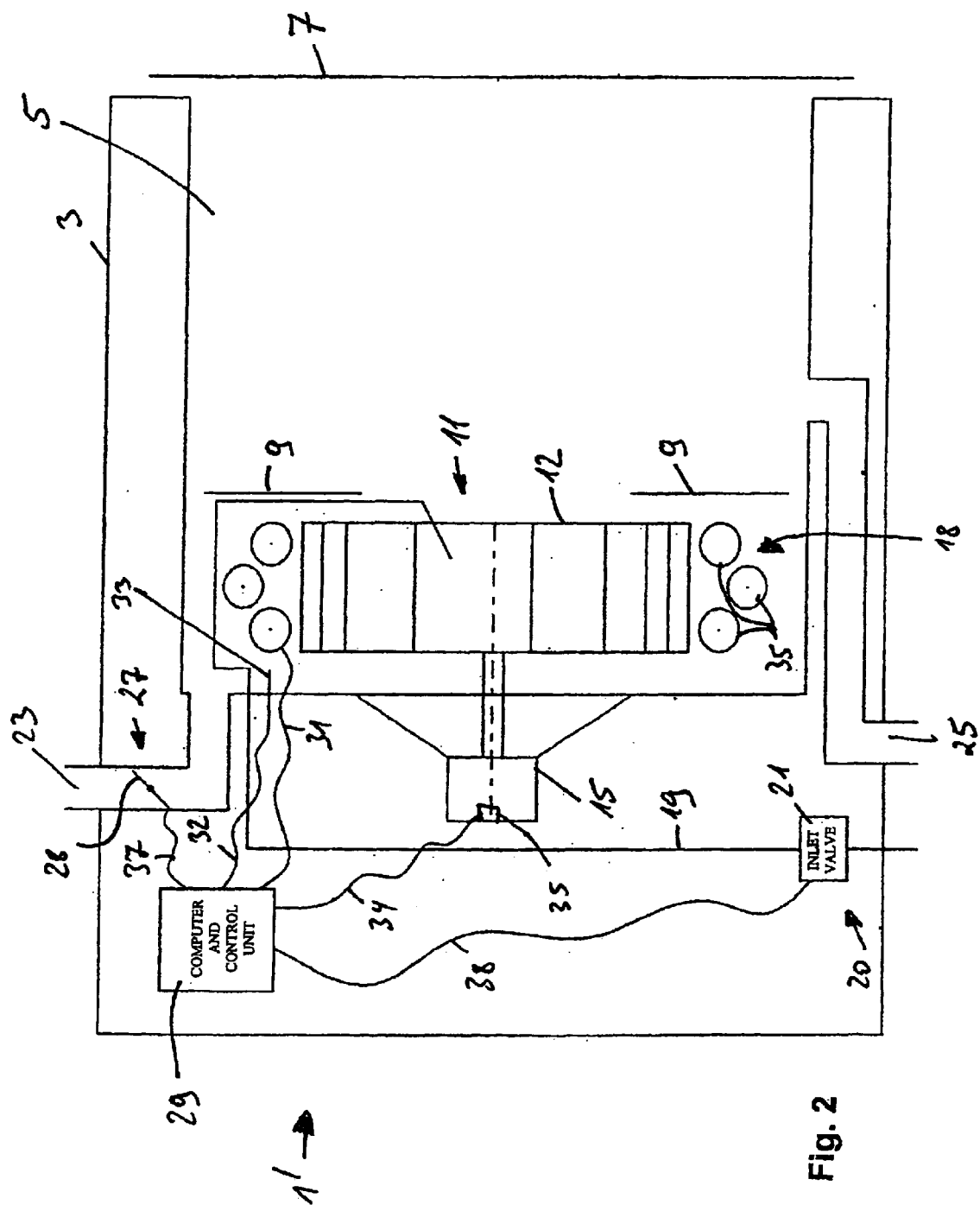
FIG. 2 shows an embodiment of the apparatus according to the invention alternative to FIG. 1.

FIG. 2 schematically shows an alternative embodiment of the device 1' according to the invention, wherein the elements identical to the embodiment of FIG. 1 are designed by identical reference numerals. In view of this, a description of these elements are not necessary.

The embodiment according to FIG. 2 differs only by the preferred design of the heating means 18. The difference is that heating means 18 is in the form of a gas-burner heat exchanger device that preferably includes pipe strands 35 arranged in a triangle. These pipe strands 35 similarly extend substantially around the radial ventilation wheel 12 as in the heating means 17 of FIG. 1.

Figure 3:
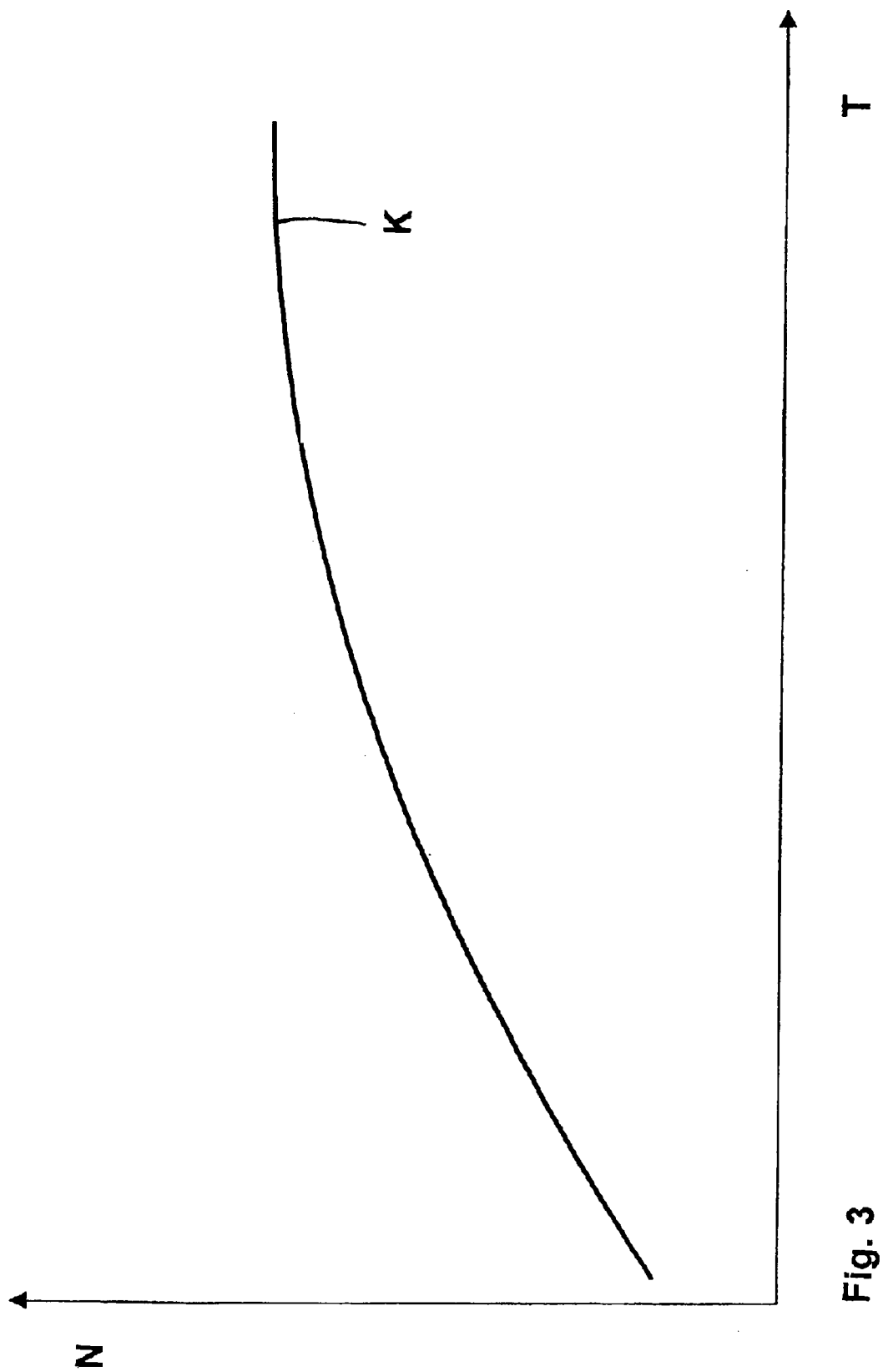
FIG. 3 shows the graphic view of a characteristic line according to the present invention.

Reference is now made to FIG. 3, where a graphic view of a characteristic line K is shown. This graphic view shows on the horizontal axis increasing values of the temperature T and on the vertical axis increasing values of speed N. The characteristic line K shown in FIG. 3 can be explained as follows: it reflects a certain moisture value, e.g. 30%, in the gas mixture and shows the relationship between the temperature T of the gas mixture and the speed N of the asynchronous motor 15. As may be seen, at a constant moisture, the speed increases if temperature increases.

Figure 4:
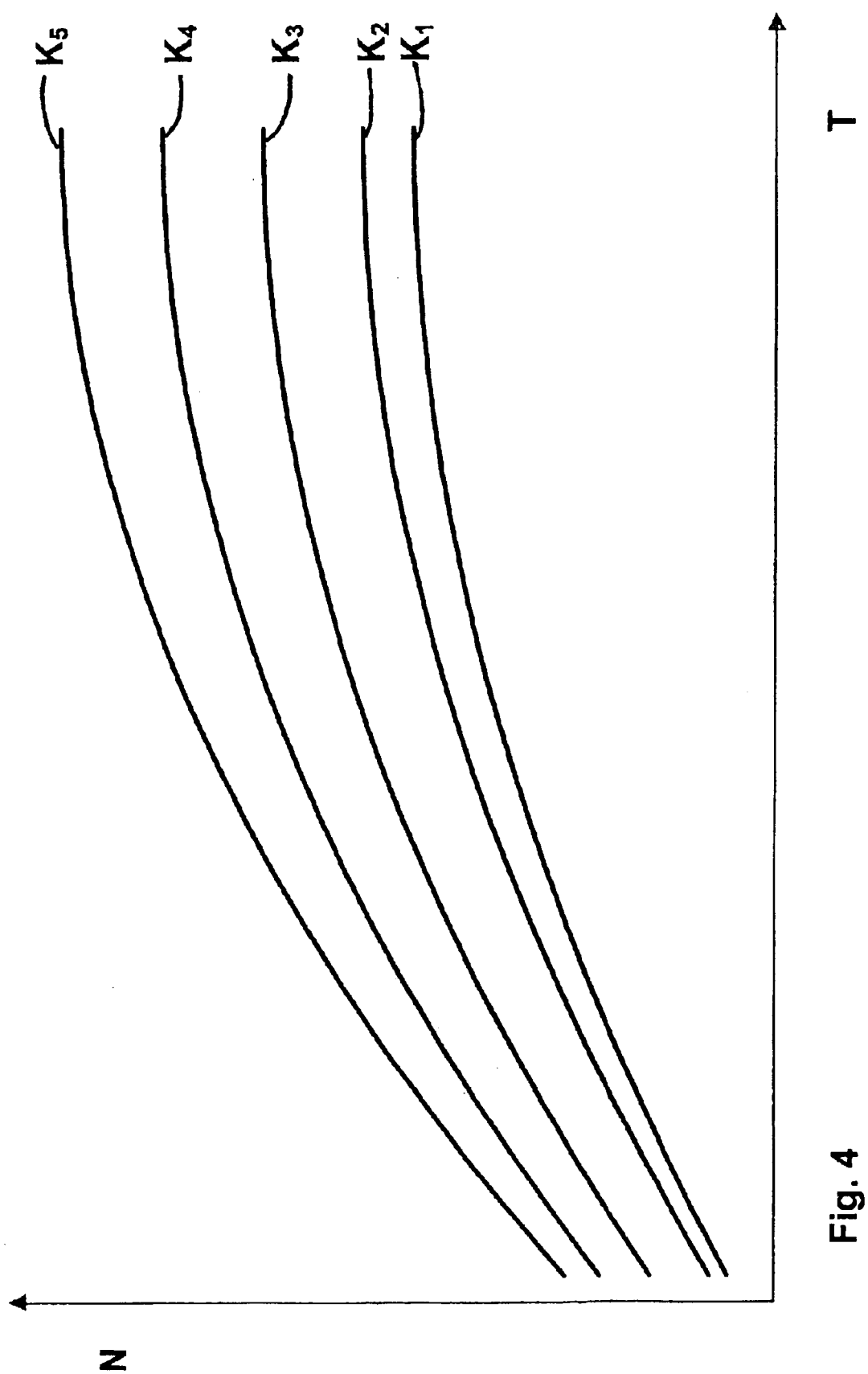
FIG. 4 shows the view of different characteristic lines depending on the moisture in the gas mixture.

Reference is now made to FIG. 4. FIG. 4 shows a graphic view of a plurality of characteristic lines $K_1$ to $K_5$. This view uses the same system of coordinates as in FIG. 3. The characteristic line $K_1$ is the lowermost characteristic line and it corresponds to a dry cooking chamber atmosphere or a dry gas mixture. The characteristic line $K_1$ is detected as follows:

Apparatus 1 or 1' is heated without adding moisture and thus with ambient air within the cooking chamber 5. For the area of the apparatus that is being detected, the heating begins at room temperature, i.e. approx. 20° C., and ends at the maximum process temperature. Speed values at continuously detected cooking chamber temperatures are also continuously detected and combined to form the characteristic line $K_1$, wherein these values are stored as characteristic line $K_1$ in the computer and control unit 29.

The moisture in the cooking chamber is calculated depending upon the temperature according to the formula $$\text{Moisture} = \Delta N^{exp(T)}.$$

The exponent, (exp)T, therefore depends upon the temperature. Moreover, this exponent also depends on additional parameters that can be taken into consideration and given appropriate weight by the computer and control unit 29. Parameters of this kind are the direction of rotation of the ventilator, the size of the apparatus and possibly also the process of moisturization or de-moisturization of the cooking chamber.

The characteristic lines $K_2$ to $K_5$ show speed values of the asynchronous motor 15 for different, however constant, moistures. The characteristic line $K_2$ may for instance correspond to a moisture of 25%, the characteristic line $K_3$ may correspond to a moisture of 50%, the characteristic line $K_4$ may correspond to a moisture of 75% and the characteristic line $K_5$ may correspond to a moisture of 100%. Of course these values do not mean relative humidity but, depending on the temperature, the maximum degree of moisture saturation of the gas mixture.

An example will now be given to elucidate the method according to this invention. The cooking chamber 5 is, for instance, at 150° C., which is detected by the temperature sensor 33, and the speedometer 35 detects a speed of 1440 revolutions per minute in the motor 15. According to the characteristic line $K_1$, a speed of 1420 revolutions per minute corresponds to dry air at 150° C. This results in a $\Delta N$ of 20 revolutions per minute. This $\Delta N$ therefore corresponds to a certain moisture that exists in the gas mixture and this moisture value may be displayed accordingly by the apparatus.

The present invention also provides a method that controls the moisture level within the cooking chamber 5. The present invention further provides for a cooking apparatus in which a moisture control of this kind is realized.

The moisture value determined according to the above description is compared by the computer and control unit 29 to a moisture value (target value/actual value comparison) for moisture control in a corresponding program step. Based on the comparison made, the unit 29 operates either the moisture discharge device 27 or the moisture supply device 20 via lines 37 and 38, respectively.

If the moisture is too high for the cooking process, the controllable flap 28 is opened and fresh unmoisturized air flows into the cooking chamber. This air partially displaces the gas mixture located in the cooking chamber 5 via the outlet channel 25 and thereby reduces the moisture in the cooking chamber 5.

If, according to the comparison, the moisture is too low, the controllable water supply means 19 is operated via the line 38 and water is sprayed into the ventilation fan, whereby the moisture in the cooking chamber 5 is immediately increased.

The present invention is not restricted to the embodiments shown. The gas supply and circulation mechanism 11 may also be mounted on the side instead of in the back of the apparatus. The spoiler 9 may extend perpendicular to the door. The discharge channel 25 may also be formed as a separate channel. Furthermore, the unit 29 may also be arranged laterally in the apparatus. It is evident that many other alternatives, modifications and variations will be apparent to those skilled in the art. Accordingly, this invention is intended to embrace all such alternatives, modifications and variations that fall within the spirit and broad scope of the appended claims.

Thus, an extremely efficient method of detecting the moisture in an apparatus for treating and preparing food is provided by the present invention, as well as an especially simple solution for achieving an apparatus for treating and preparing food by means of which optimal cooking processes are obtained.

What is claimed is:

1. A method to detect moisture in a gas mixture in an apparatus for treating and preparing food of the type where the gas mixture can be circulated by a gas supply and circulation mechanism and the gas supply and circulation mechanism is driven by an asynchronous motor, the method comprising:

detecting a temperature of the gas mixture and a first speed of the motor to generate measured values of the temperature and the first speed;

comparing the measured values of the temperature and the first speed to at least one characteristic line that is stored in a computer, the characteristic line comprising measured speeds of the motor over a range of temperatures at a constant moisture value; and determining the moisture in the gas mixture from the deviation of the measured value of the first speed from a second speed of the motor associated with the measured value of the temperature on the characteristic line to generate a detected moisture value, whereby the method is free of a step of determining a pressure of the gas mixture.

2. The method of claim 1 wherein the characteristic line is generated under defined conditions of the apparatus.

3. The method of claim 2 wherein the characteristic line is generated when the gas mixture is dry.

4. The method of claim 2 wherein the range of temperatures begins at about 20° C. and ends at a maximum process temperature for the apparatus.

5. The method of claim 2 wherein a calibration of the apparatus is carried out at a location to generate the characteristic line at the location.

6. The method of claim 5 wherein the calibration is carried out at any time during the life of the apparatus.

7. The method of claim 1 wherein the detected moisture value is used as a control variable to regulate the moisture content in the gas mixture in the apparatus.

8. An apparatus for treating and preparing food comprising:

a cooking chamber having a gas mixture, wherein the gas mixture has a temperature and moisture;

a gas supply and circulation mechanism adapted to circulate the gas mixture within the cooking chamber, to introduce gases into the cooking chamber, and to discharge gases from the cooking chamber;

an asynchronous motor mechanically connected to the gas supply and circulation mechanism and having a speed;

a speedometer adapted to measure the speed of the asynchronous motor and to generate a speed value;

a temperature sensor adapted to measure the temperature of the cooking chamber and to generate a temperature value; and a computer and control unit having a memory and adapted to receive the values, wherein the unit compares the values with a characteristic line stored in memory to generate a moisture value for the gas mixture, the characteristic line comprising measured speeds of the motor over a range of temperatures at a constant moisture value.

9. The apparatus of claim 8 further comprising a controllable moisture supply device and a controllable moisture discharge device, wherein either the moisture supply device or the moisture discharge device or neither of these devices is activated based on a comparison of the moisture value with a moisture target value, whereby the preferred moisture level in the cooking chamber is achieved for a particular treatment and/or preparation step.

10. A method to detect moisture in a gas mixture in an apparatus for treating and preparing food of the type where the gas mixture can be circulated by a gas supply and circulation mechanism and the gas supply and circulation mechanism is driven by an asynchronous motor, the method comprising:

operating the apparatus to generate at least one characteristic line that is stored in a computer to calibrate the apparatus;

detecting a temperature of the gas mixture and a first speed of the motor to generate measured values of the temperature and the first speed;

comparing only the measured values of the temperature and the first speed to the characteristic line; and determining the moisture in the gas mixture from the deviation of the measured value of the first speed from a second speed of the motor associated with the measured value of the temperature on the characteristic line to generate a detected moisture value.

11. The method of claim 10 wherein the calibrating step is performed under defined conditions of the apparatus.

12. The method of claim 11 wherein the calibrating step includes generating the characteristic line from measuring a plurality of speeds of the motor over a range of temperatures beginning at about 20° C. up to a maximum process temperature for the apparatus with the gas mixture being ambient air.

13. The method of claim 11 wherein the apparatus has physical characteristics and the characteristic line is generated such that the influence of the physical characteristics upon the speed of the motor is taken into consideration.

14. The method of claim 13 further comprising the step of providing the apparatus at a location and wherein the calibrating step is carried out at the location.

15. The method of claim 14 wherein the calibrating step is carried out at any time during the life of the apparatus.

16. The method of claim 15 wherein the gas supply and circulation mechanism is a radial ventilation fan.

17. An apparatus for treating and preparing food comprising:

a cooking chamber having a gas mixture, wherein the gas mixture has a temperature and moisture;

a gas supply and circulation mechanism adapted to circulate the gas mixture within the cooking chamber;

an asynchronous motor mechanically connected to the gas supply and circulation mechanism and having a speed;

a speedometer adapted to measure the speed of the asynchronous motor and to generate a speed value;

a temperature sensor adapted to measure the temperature of the cooking chamber and to generate a temperature value; and a computer and control unit having a memory and adapted to receive the values, wherein the unit compares only the values with a characteristic line stored in memory to generate a moisture value for the gas mixture, the characteristic line being generated by operation of the apparatus to calibrate the apparatus.

18. The apparatus of claim 17 wherein the calibration is performed under defined conditions of the apparatus.

19. The apparatus of claim 18 wherein the calibration includes generating the characteristic line from measuring a plurality of speeds of the motor over a range of temperatures beginning at about 20° C. up to a maximum process temperature for the apparatus with the gas mixture being ambient air.

20. The method of claim 18 wherein the apparatus has physical characteristics and the characteristic line is generated such that the influence of the physical characteristics upon the speed of the motor is taken into consideration.

21. The method of claim 20 wherein the calibration is carried out at a location to generate the characteristic line at the location.

22. The method of claim 21 wherein the calibration is carried out at any time during the life of the apparatus.

23. The method of claim 22 wherein the gas supply and circulation mechanism is a radial ventilation fan.

* * * * *